United States Patent
Fredkin et al.

[15] 3,693,042
[45] Sept. 19, 1972

[54] RAPID FILM READER/RECORDER UTILIZING MOVABLE CYLINDRICAL LENS

[72] Inventors: Edward Fredkin, Natick, Mass.; Walter Renold, Los Angeles, Calif.

[73] Assignee: Information International, Inc., Cambridge, Mass.

[22] Filed: Aug. 21, 1969

[21] Appl. No.: 851,839

[52] U.S. Cl............315/18, 178/7.2 D, 178/7.85, 178/7.79, 178/7.88
[51] Int. Cl.............................................H01j 29/70
[58] Field of Search........178/7.2 D, 7.85, 7.88, 7.92; 328/124; 315/18

[56] References Cited

UNITED STATES PATENTS

| | | | |
|---|---|---|---|
| 3,340,359 | 9/1967 | Fredkin | 178/7.2 D |
| 1,976,377 | 10/1934 | Von Bronk | 178/7.2 D |

Primary Examiner—Benjamin R. Padgett
Assistant Examiner—J. M. Potenza
Attorney—Samuel Lindenberg and Arthur Freilich

[57] ABSTRACT

Apparatus for high speed reading and recording on film and the like comprising a cathode ray tube for generating a scanning spot which can move within a raster area on the tube face, and a pair of small perpendicular cylindrical lenses that focus an image of the raster area on a small region of a film frame where the lenses cross. Each of the cylindrical lenses can be moved, to shift the scanning spot to any region on the film frame, the scanning spot being movable within the raster area on the tube face to compensate for lag in lens movement. A transducer for indicating the position of each lens comprises a stationary pattern of illuminated lines which is focused by an end portion of that lens onto a stationary transparent plate with opaque stripes, and a photodetector behind the plate.

19 Claims, 13 Drawing Figures

INVENTOR.
EDWARD FREDKIN
WALTER RENOLD
BY
Lindenberg & Freilich
ATTORNEYS

INVENTOR
EDWARD FREDKIN
WALTER RENOLD

BY
Lindenberg & Freilich
ATTORNEYS

RAPID FILM READER/RECORDER UTILIZING MOVABLE CYLINDRICAL LENS

BACKGROUND OF THE INVENTION

1. Field of the Invention

This invention relates to apparatus for high speed reading and recording on film and the like.

2. Description of the Prior Art

There are many areas, such as in geological exploration and medical research, where vast quantities of data are quickly amassed in graphical and pictorial form, that must be analyzed. For example, motion picture film records can be made of rapidly changing displays on cathode ray tube indicators. However, these film records typically accumulate in enormous lengths in short periods of time. The analysis of film records can be accomplished manually or semi-automatically. For example, an operator can repeatedly align cross-hairs on successive points of an image, and transducers can be used to record the coordinates of the cross-hairs. However, such methods are slow, tedious, and expensive when large quantities of data must be analyzed, and are often of very limited accuracy.

One system for the automatic high speed reading and recording of pictorial records is described in copending U.S. Pat. application Ser. No. 437,460, filed Mar. 5, 1965, entitled "High Speed Film Reader/Recorder with Grid Reference" by Edward Fredkin and assigned to the assignee of the present application. That application describes a system wherein a reduced-size image of a cathode ray tube raster area, over which the scanning spot can move, is focused in the plane of a film record. The raster area image covers only a small region of a film frame, but it can be shifted to any selected region by moving the film frame along perpendicular X and Y axes which are respectively parallel to the film length and width. In order to accurately determine the position of the moving film in relation to the scanning spot image thereon, a fine grid is placed immediately adjacent to the film, the grid moving with the film. As the film is moved relative to the raster area to focus the raster on a different region of a film frame, the grid repeatedly interrupts the spot. The interruptions are recognized by a photosensor and counted by a computer means to determine when the desired film frame region has been reached.

While the system of the above copending application enables automatic high speed reading, it is sometimes difficult to provide economical high speed apparatus for moving the film frame in two directions, especially when the film record is part of a long roll of film. In addition, the grid apparatus and equipment for counting lines traversed as the raster spot and grid both move can add complexity.

OBJECTS AND SUMMARY OF THE INVENTION

An object of the present invention is to provide simple and reliable high speed reader and recorder apparatus.

Another object is to provide high speed reader and recorder apparatus which enables the accurate location of a projected cathode ray tube raster area at different positions on a film with a minimum movement of the film.

In accordance with the present invention, relatively simple apparatus is provided for high speed reading and recording of pictorial information on film or other record medium. The apparatus comprises a cathode ray tube (CRT) that generates a scanning spot which can move within a raster area on the tube face. A small lens device immediately in front of the film forms a greatly reduced image of the raster area on a small region of the film frame. Apparatus is provided for moving the lens device to cover different regions of the film frame. Transducers sense the position of the lens device to determine the film frame region which is covered by the raster area. The information from the transducers is used to control the position of the spot on the film, coarse corrections being effected by shifting the lenses and rapid fine corrections being effected by shifting the spot position on the CRT.

In one embodiment of the invention, the lens device comprises a pair of cross cylindrical lenses which form an image of the raster area at a region behind the location where the lenses cross. A separate transducer is used to determine the position of each lens. Each transducer includes a stationary narrow plate with alternate transparent and opaque lines or stripes spaced along its length. The plate extends along the path taken by the end portion of the lens, so that part of the plate is always covered by the lens. A pattern of illuminated lines is established that can be focused by the end portion of the lens onto the narrow striped plate, and photodetector apparatus behind the plate senses the amount of light which passes through it. As the lens moves along the striped plate, the illuminated lines, imaged or projected, on the plate move along with the lens. Thus, the illuminated lines are alternately blocked and unblocked by the opaque stripes, and the photodetector apparatus can sense this. The light fluctuations are counted to determine the amount of movement of the lens. In order to enable a determination of the direction of lens movement, the plate is split into two narrow half-areas, with the transparent and opaque stripes on each half-area offset slightly from those of the other half-area. A separate photodetector is positioned behind each half-area, and a comparison of the outputs of the two photodetectors enables a determination of the direction of lens movement.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
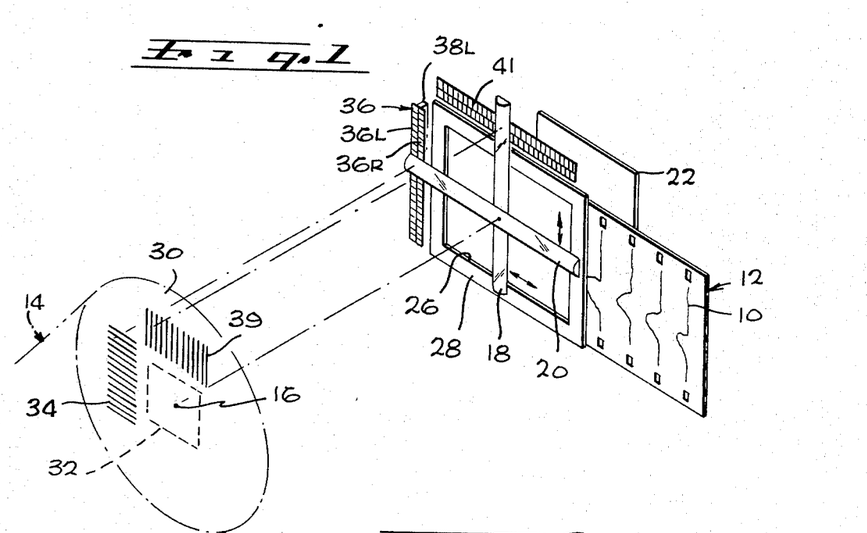
FIG. 1 is a perspective view of apparatus constructed in accordance with the invention, for illustrating principles of operation of the invention.

FIG. 1 is a highly simplified illustration of a film reader for reading pictorial records, such as function lines 10 recorded on a film type record medium 12. The apparatus comprises a controllable light source such as a cathode ray tube 14 which provides a scanning spot 16 that can be rapidly moved on the face of the tube. An image of the spot 16 is focused in the plane of the film 12 by a pair of cross cylindrical lenses 18 and 20. The cylindrical lenses are generally only sectors of a cylinder or a body with a slightly oval or partially parabolic cross section, but are generally referred to as cylindrical lenses. The spot is focused at a point lying in the small region of film behind the position where the lenses cross. The light spot image is transmitted through the film with an intensity dependent on the film density at the point where the spot is focused, and it is sensed by a light detector 22 placed behind the film. Light shields (not shown in FIG. 1), to be described below, prevent light from falling on any portion of the film outside the area where the lenses cross.

With the crossed lenses 18 and 20 at given positions, the entire small region of film covered by them where they cross can be scanned by moving the spot 16 on the face of the cathode ray tube (CRT). The region of film that can be scanned by the spot can be changed by moving either or both lenses 18 and 20, to change the region where they cross. The output of the light detector 22 indicates the density or relative opacity (or transmissivity) of the film at the point being scanned and thus, for example, will indicate the presence of a function line 10. If the film is uniformly transparent except at the function lines 10 which are uniformly opaque, then the detector 22 will sense the scanning spot for all positions except when the spot intersects the function line 10. The output of detector 22 will therefore contain the information necessary to reproduce the film record by relating it to the positions of the scanning spot and of the lenses 18 and 20. The detector output is delivered to a computer control system which can control the movement of the scanning spot 16 as well as the positioning of lenses 18 and 20. When the point where the spot image lies on the film approaches the boundaries of the small region behind the crossed lenses, one of the lenses may be shifted by the computer control system so that a new film region can be scanned. When the entire film frame (or desired portion thereof) within the aperture 26 of a plate 28 has been scanned, the film may be advanced by the length of one frame.

The entire film frame lying within the plate aperture 26 could be scanned by providing a large fixed lens that covers the entire area and by moving the scanning spot 16 over a large area of the CRT. This would eliminate the need for crossed cylindrical lenses or the like. However, it is found that the spot on the CRT face 30 tends to be sharp and of uniform size and intensity only over a relatively small central region of the face. Another way to eliminate moving of a lens in front of the film frame is to use a CRT with very small spot size and a very large number of discrete points displayed with great spacial accuracy. For example, a 3 × 3 inch CRT raster area could define 4,096 discrete points per line (or 1,365 points per inch). When projected onto a film frame area of 1 × 1 inch, at a 3:1 reduction ratio, this would result in a resolution of 4,096 points per inch. However, the prior art has shown that it would be very difficult and expensive to provide such a CRT and the associated electronics.

In accordance with the present invention, the same resolution of 4,096 points per inch on the film may be obtained with a CRT point density of only about 164 points per inch, if it is combined with a 25:1 optical reduction, and with mechanical scanning means, such as provided by the illustrated crossed lenses, to shift the raster area to any region of the film. These lenses reduce the 3 × 3 inch CRT raster area to a 0.12 × 0.12 inch film region, with the same 4,096 points per inch resolution. The cost of such a tube with the low point density of about 164 points per inch and associated electronics is only a fraction of the cost of a tube with a precision raster of about 1,365 points per inch over a 3 × 3 inch raster area. The fractional magnification of the crossed lenses essentially images the raster area 32 (all of which is dark except for the spot 16) onto a region of the film which covers only a fraction of the film frame area defined by the plate aperture 26. While the scanning of this film are is performed by the lenses, the CRT spot moves within its raster area only to compensate for the lenses' dynamic position errors.

In order to utilize the high resolution made possible by the reduced-size scanning spot, transducers must be provided for accurately locating the positions of the cylindrical lenses 18 and 20. As shown in FIG. 1, a transducer for the lens 20 comprises a transducer light pattern 34 preferably formed in the plane of the CRT face 30. The light pattern 34 contains a large number of horizontal luminous lines, which are vertically spaced from each other. The pattern 34 can be formed, for example, on a portion of the CRT face outside of the raster area 32, by attaching strips of white material thereon and shining a light on them. Many other techniques can be utilized for creating the light pattern 34. Regardless of how the pattern 34 is formed, however, the end portion of the cylindrical lens 20 will substantially focus it onto a transparent plate 36 which has horizontal opaque lines or stripes thereon, also vertically spaced, at the left half 36L thereon. (The function of the right half 36R of the plate will be discussed below.)

Because of the optical reduction, the vertical spacing between the opaque lines on plate portion 36L is the same as the vertical spacing of the luminous lines in the image projected by the lens 20 thereon. (Alternatively, the luminous lines may be spaced by an integral multiple, of more than one, of the spacing of the opaque lines). Thus, it is possible for all of the imaged luminous lines to fall on the opaque lines of plate portion 36L, in which case no light is transmitted through the plate portion 36L. Alternatively, it is possible for the luminous lines to fall between the opaque lines, in which case all of the light of the luminous lines will pass through the plate portion 36L. As the lens 20 moves up or down, the image of luminous lines moves up or down, respectively, along the length of the plate portion 36L. A photodetector 38L, such as a photomultiplier tube, placed behind the plate portion 36L detects the transmitted light. Each time the output from the photodetector 38L reaches a maximum, it indicates that the lens 20 has moved by a distance equal to the spacing between the opaque lines of the plate portion 36L. By counting the light fluctuations, the lens travel is measured. The opaque lines may be spaced a distance such as 0.01 mm apart, so that high resolution of lens position can be obtained.

While a single plate half 36L can indicate the amount of lens movement, it is not sufficient to determine the direction of lens movement, i.e., whether the lens is moving up or down. The right half 36R of the plate 36 enables a determination of the direction of lens movement. The right portion 36R is identical to the left portion, except that the opaque lines thereon are vertically offset from the opaque lines on the left portion by one-fourth the vertical spacing or pitch of the lines, i.e., one-half the line width. Therefore, when the imaged luminous lines are completely blocked by the left portion 36L, they are only partially blocked by the right portion 36R. Another photodetector (not shown) behind the right plate portion 36R detects the light passing through that plate portion. A comparison of the outputs from the photodetector behind the two portions 36L and 36R shows a 90° phase difference, which enables a determination of the direction of movement of the lens 20.

A transducer is also provided for the lens 18 to determine its horizontal position. The transducer for lens 18 is similar to the previously described transducer, comprising a light pattern 39 with luminous lines thereon. The lines are focused by an end portion of lens 18 onto a split transparent plate 41 with staggered opaque lines on each half. A pair of photodetectors (not shown), one behind each half of plate 41, indicates the movement of the lens 18 relative to the plate 41. A more detailed description of the transducer systems for lenses 18 and 20 will be given below.

Figure 2:
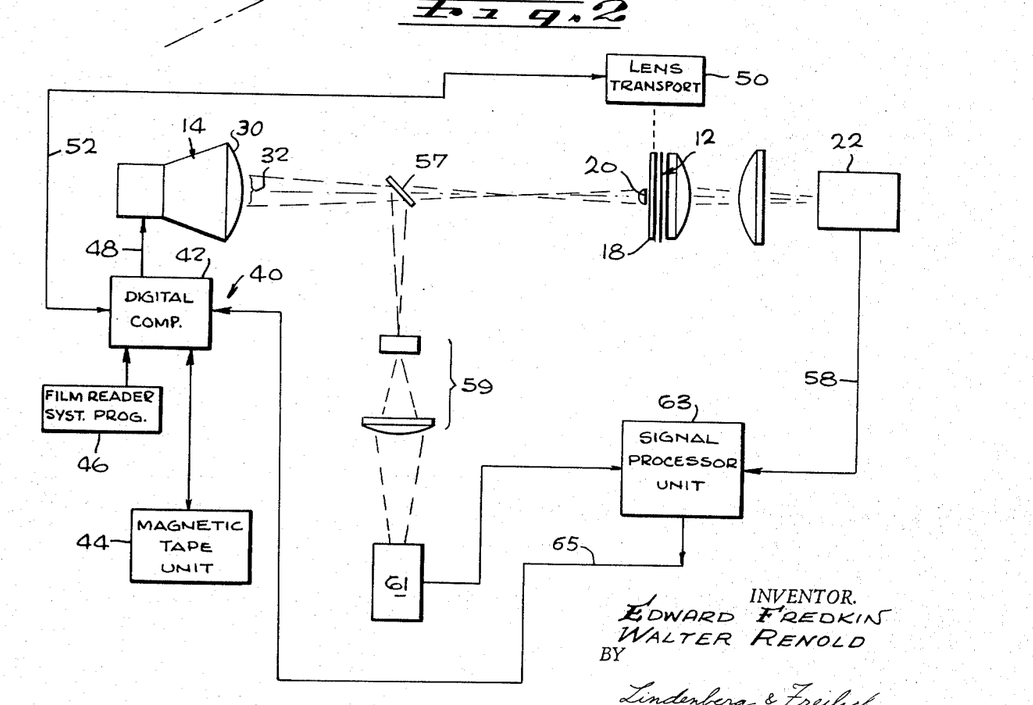
FIG. 2 is a block diagram of an entire reader/recorder system constructed in accordance with the invention, which utilizes the apparatus of FIG. 1.

FIG. 2 illustrates a system which includes electronic data processing equipment 40 that controls movement of the scanning spot on the CRT 14 and controls movement of the cylindrical lenses 18 and 20 over the film 12. The data processing equipment includes a general purpose digital computer 42, an associated magnetic tape unit 44, and a film reader system program unit 46. The computer is coupled to the CRT through a coupling path 48, for applying signals to the deflector elements of the CRT. The computer is also coupled to a lens transport 50 over a coupling path 52. The lens transport, to be described below, moves the two lenses 18 and 20 so that an image of the scanning spot can fall on a particular region of the film frame. The transducers (not shown in FIG. 2) for sensing the position of the lenses, deliver signals to the computer 42 over the same coupling path 52, to enable accurate sensing of lens positions. A film transport (not shown in FIG. 2) advances the film 12 by a length of one frame after a frame area has been scanned.

An optical system is employed for imaging the raster area 32 on the CRT face 30, onto the film at a reduced scale. As described above, movement of the scanning spot is restricted to the raster area 32 on the CRT face, and its image moves over only the film area covered by the crossed lenses 18 and 20. The light spot imaged on the film may be blocked by an opaque film area or passed through a transparent film area. Light passing through a transparent film area is received by a photomultiplier-tube type light detector 22. In some instances the film may have a wide range of densities, rather than only completely opaque or transparent areas, and the system can be made to respond to these slight variations. Often, only completely opaque and transparent densities are used, and in these cases, the film may be a positive with black or opaque areas representing information, or it may be a negative with transparent areas representing information.

The CRT scanning spot can sometimes vary in brightness, so that the light detected by detector 22 does not represent the film density which is represented only by the proportion of light passing through. In order to determine the proportion of light incident on the film which passes through it, a portion of the light from the CRT is reflected by a beam-splitting mirror 57. The reflected light portion passes through an optical array 59 and is detected by a reference photomultiplier-tube sensor or photodetector 61. The output of the reference photodetector 61 is delivered to a signal processor unit 63. This unit also receives the output 58 of the photodetector 22 that detects the light passing through the film. The signal processing unit 63 generates a signal on its output coupling line 65, which represents the proportion of light incident on the film.

The output of the signal processing unit 63, which represents light detected by detector 22 after standardizing by comparison with the output of reference detector 61, is applied through coupling 65 to the general purpose digital computer 42 to indicate whether information has been detected. A detection of information at each instant is indicated by the presence or absence of light at that instant at the input of the light detector 22. The computer recognizes and identifies each detection of information, at each instant in relation to corresponding X and Y coordinates of the programmed scanning command by CRT 14 and lenses 18 and 20. Preferably, that scanning is programmed to occur on a incremental basis, rather than on the basis of a full routine scanning of all points on the raster. Such a programming is described in greater detail in U.S. Pat. No. 3,340,359, entitled "High-Speed Film Reading," wherein further detailed disclosures are also provided for the basic system and its components.

Incremental scanning, which results in higher-speed scanning of the film, may typically involve a programming of the computer which calls for a point-by-point scanning along one axis, such as the horizontal or X axis of the tube 14. Scanning along the X axis continues until a related film position is reached or a track of recorded information is detected and signalled by the light detector 22. Once this detection is made, and its X and Y coordinates are stored by the computer, the scanning is programmed to occur in a predetermined search course about the first-detected point until another point of information is found and stored. This method of scanning continues until all the recorded information sought has been discovered and stored in relation to the X and Y coordinates at which they were found. Thereafter, the information may be retrieved and processed as desired, including play-back on the CRT and recording on or comparison with another film.

Ordinarily, the relative positions of different points in different areas of the film can be determined accurately only if all the mechanical elements of the system, including the film and imaging lenses, are held absolutely still during measurements. Also, it is ordinarily necessary that the programmed scanning be extensive enough to embrace all the points of interest. However, as has already been noted above, the optical scanning must be sharp and uniform and must include a very large number of discrete stepping points, if the film-reading is to be precise. This makes it undesirable to use a very large raster area. In fact, as described above, it has been found desirable to use only the limited raster area near the CRT optical axis and to substantially reduce this area as witnessed by the film.

A small raster area can be used to read precisely a film which is relatively large in relation to the imaged raster area on it only if the imaged raster area can be shifted precisely to different regions of the film. Copending patent application Ser. No. 437,460, filed Mar. 5, 1965, entitled "High-Speed Film Reader/Recorder with Grid Reference" by Fredkin describes apparatus for moving a film record in two directions with the required degree of accuracy. As has been briefly described above, the present invention enables movement of the raster area without moving the film in the X and Y directions, by moving a small imaging lens device over the film.

Referring again to FIG. 1, it can be seen that movement of the raster area image to any region of the film can be accomplished by moving the lenses 18 and 20 in accordance with signals from the computer equipment. High precision in such movements requires high precision in the transducers for sensing lens position. A better understanding of the transducer apparatus can be had by considering FIG. 3, which illustrates, in greater detail, the position transducers for the lens 20. As previously described, the position transducer includes an area 34 with an array of vertically spaced luminous lines, which may be located on the face of the CRT. An end portion 20E of lens 20 forms an image of the luminous lines on the transparent plate 36, which is divided into two halves 36L and 36R. Where needed, a higher brilliance of image can be obtained by forming the lens portion 20E as a uniformly convex lens instead of as a cylindrical lens, whereby positioning another, vertically extending cylindrical lens over the plate 36. Two light pipes 37L and 37R are positioned behind the plate, light pipe 37L being positioned to receive only the light passing through the plate portion 36L, and light pipe 37R being positioned to receive only the light passing through plate portion 36R. The light pipes 37L and 37R direct the light received to photodectors 38L and 38R, respectively.

Figure 3:
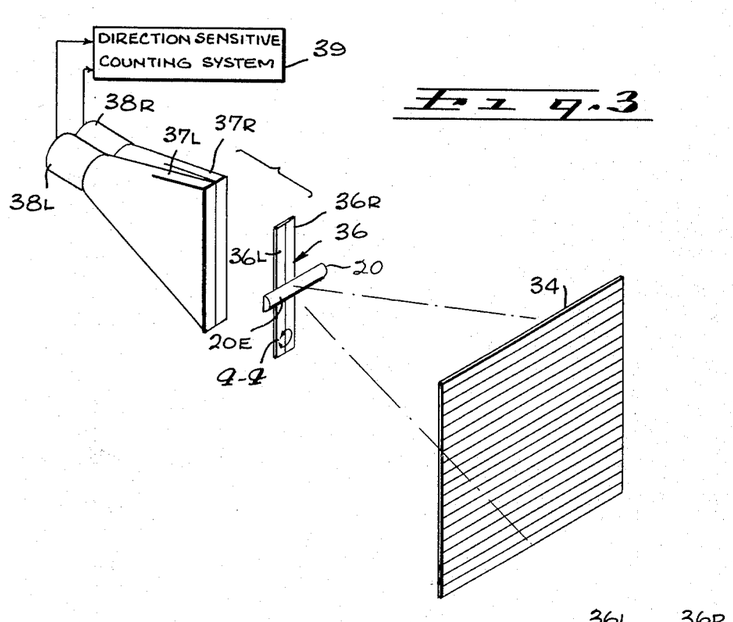
FIG. 3 is a perspective view of a transducer of the apparatus of FIG. 1.
Figures 4, 5A:
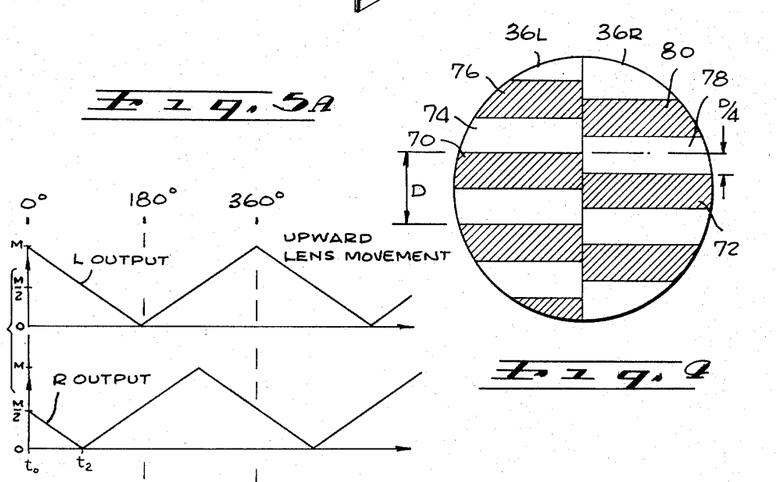
FIG. 4 is an enlarged view of the area 4—4 of FIG. 3.
FIGS. 5A and 5B are graphs showing the variations in output of the photodetectors of FIG. 3 for upward and downward lens movement, respectively.

A small area of the plate 36 is shown in the enlarged view of FIG. 4. Each half-portion of the plate has opaque and transparent lines or stripes of equal width. However, the lines on the two plate portions are offset by one-fourth the distance D between opaque lines. For example, opaque line 70 on portion 36L is higher than the nearest line 72 on portion 36R by D/4. When the imaged luminous lines lie on the transparent areas of plate portion 36L, the photodetector 38L generates a maximum output. When the imaged luminous lines are aligned with the transparent areas of plate portion 36R, the photodetector 38R generates a maximum output. As the lens 20 moves up the plate 36, the outputs of the photodetectors 38L and 38R vary in the manner shown by the graph lines of FIG. 5A labeled "L output" and "R output," respectively.

The operation of the transducer can be understood by considering the case where the lens 20 is moving up, causing the image of the transparent lines to move up the plate 36. At an instant $t_0$ (FIG. 5A) the imaged luminous lines are assumed to be completely aligned with the transparent lines on the left plate portion 36L. Thus, one luminous line completely covers the transparent area 74 but does not even partially cover the opaque lines 76 and 70 above and below it. Thus, the output of the left photodetector 38L is at a maximum level $M$ as shown in FIG. 5A. At the same instant $t_0$, the luminous image line will also fall on the right plate portion 36R, where it will cover the upper half of the transparent area 78 and the lower half of opaque line 80 above it. Accordingly, the output of the right photodetector 38R is only $M/2$ at time $t_0$ as shown in FIG. 5A for the "R output" graph.

At a next instant $t_2$, the lens has moved up by a distance D/4 to a position where the luminous line covers the upper half of transparent line 74 and the lower half of opaque line 76. Then, the output "L output" shown in FIG. 5A has fallen to $M/2$. At this instant, the luminous line covers opaque space 80, and the output "R output" has fallen to zero. Further upward movement provides the rest of the graph of FIG. 5A. If a movement of the lens by a distance $D$ is considered to be a 360° movement, the "R output" of photodetector 38R is seen to lead the "L output" of photodetector 38L by 90°.

Figure 5B:
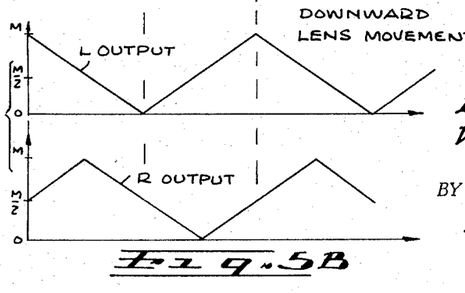

If, instead of moving up, the lens moves down from an initial position where a luminous line covers transparent area 74, the outputs "L output" and "R output" of photodetectors 38L and 38R will be as given in FIG. 5B. In the case of downward movement, "L output" is seen to lead "R output" by 90°. A direction sensitive counting system 39 coupled to the outputs of photodetectors 38L and 38R, includes a phase comparison circuit to indicate the direction of lens movement. The sawtooth waveforms shown in FIGS. 5A and 5B are first converted into square waves (a signal above $M/2$ equals 1, and a signal below $M/2$ equals 0). A phase comparison circuit, or gray code discrimination senses the direction of movement of each step and causes an electronic counter to count the steps of the movement either up, or down, in order to provide, at every instant, an indication of the position of lens 20. A reversible updown counter of a type such as model 5280A manufactured by the Hewlett-Packard Co. of Palo Alto, Calif., and supporting circuitry can be used to provide signals to the computer that indicate the position of the lens 20 at every instant.

The output signals from photodetectors 38L and 38R can be easily used to provide an effective resolution of one-fourth the line spacing, or $D/4$, or to provide an even finer resolution. Thus, a line spacing $D$ on the plate 36 of 0.01 mm can be readily used to derive a resolution of the position of lens 20 of 0.0025 mm or even less. While the transducer has been described for lens 20, a similar construction can be used for the other lens 18 to determine its position at every instant. It should be noted that many variations of the transducers can be employed. For example, instead of transparent and opaque lines, reflecting and non-reflecting lines or strips can be employed to control light reflections to photodetectors. The transparent and reflecting strips serve as light passing strips, while the opaque and non-reflecting lines serving as light stopping strips in these examples.

Figure 6:
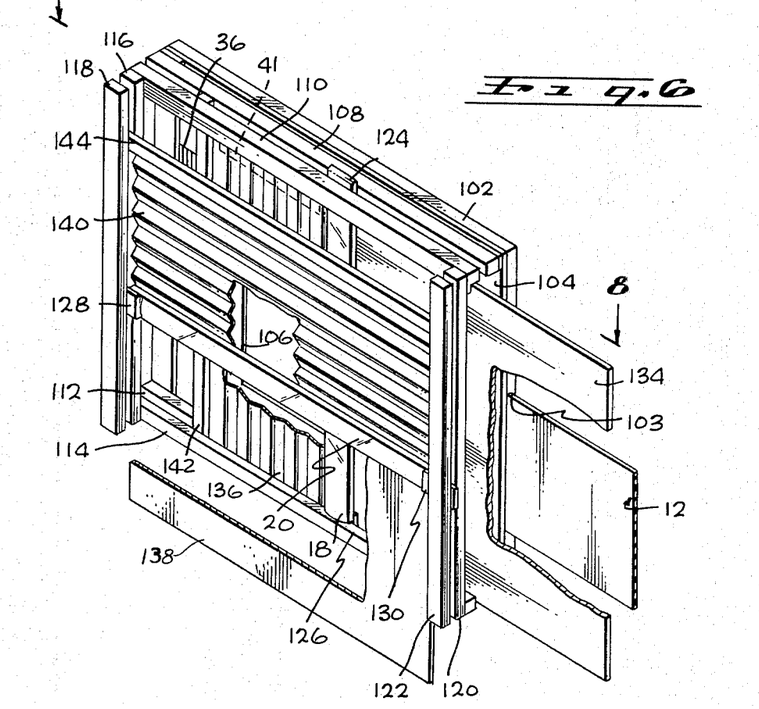
FIG. 6 is a perspective view of reader/recorder apparatus constructed in accordance with the invention, with portions thereof broken away.
Figure 7:
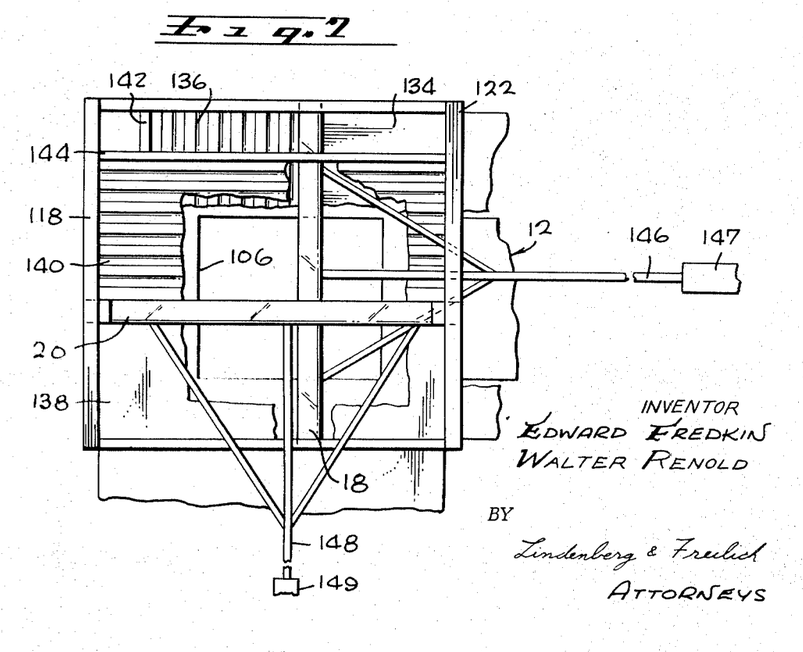
FIG. 7 is a front elevation view of the apparatus of FIG. 6.
Figure 8:
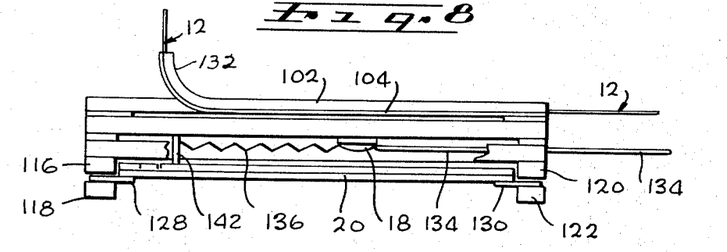
FIG. 8 is a view taken on the line 8—8 of FIG. 6.

FIGS. 6, 7 and 8 illustrate a mechanism for moving the cylindrical lens 18 and 20. The film 12 moves through a frame which comprises a backup plate 102 and a front plate 104, the backup plate having a channel 103 through which the film moves. The plates have apertures 106 for allowing light to pass through an entire frame of film. A light detector (not shown) is placed behind the aperture in the backup plate to detect any light passing through the film.

Four pairs of rails are provided to guide the lenses, including upper rails 108, 110, lower rails 112, 114, left side rails 116, 118, and right side rails 120, 122. The lens 18 has lugs 124 and 126 at either end that are engaged with the upper and lower rails, while lens 20 has lugs 128 and 130 that are engaged with the left and right side rails. The rails support and guide the lug-supported lenses in their movement over the film frame. The transducer array plates 36 and 41 are placed at the left side and top of the frame, outside of the film frame apertures 106 but within the rails. Photodetectors (not shown) are placed behind each of the array plates 36 and 41. In order to provide space for a photodetector pair behind array plate 36, the film moves around a curved guide plate 132, shown in FIG. 8.

The CRT scanning spot is focused in the region where the lenses 18 and 20 cross. In order to prevent light rays of the CRT spot from passing through any other portion of the film, four light shields 134, 136, 138 and 140 are provided. The shield 134 is a rigid sheet positioned at one side of lens 18, the shield moving sideward with the lens. The shield 136 is a foldable shield fixed at one end by a stationary bar 142 and fixed at the other end to the movable lens 18. The foldable shield 136 is corrugated so that it can expand and contract in length. The two shields 134 and 136 block all light on either side of lens 18.

The other two shields 138 and 140 are similar in construction to the shields 134 and 136, respectively. Shield 138 is rigid and fixed to lens 20. Shield 140 is foldable, having one end fixed to a stationary bar 144 and an opposite end fixed to the lens 20. The two shields stop light on either side of lens 20. The combined effect of the four shields is to stop all light from passing through the film frame aperture 106 except through the region where the lenses 18 and 20 cross, and also the areas where the lenses cover the array plates 36 and 41. As shown in FIG. 7, movement of the lenses 18 and 20 is provided by motors 147 and 149 that are attached thereto by connecting bar structures 146 and 148. It may be noted that if the array plates 36, 41 are placed further away from the film frame, at a distance from the nearest edge of the aperture 106 greater than the width of a shield, then a rigid shield may be used whenever a foldable shield is shown. Of course, this would entail the use of larger structures for carrying the cylindrical lenses with the attendant greater masses, but would simplify the shield construction.

Figure 9:
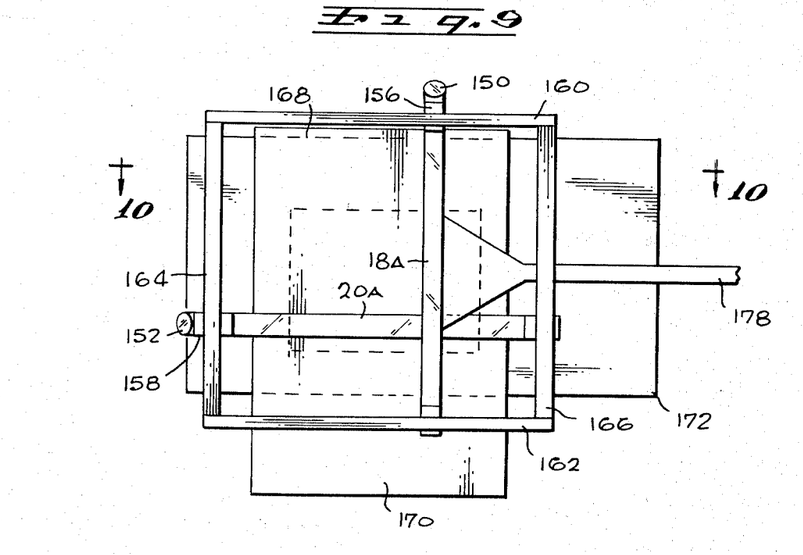
FIG. 9 is a front elevation view of apparatus constructed in accordance with another embodiment of the invention.
Figure 10:
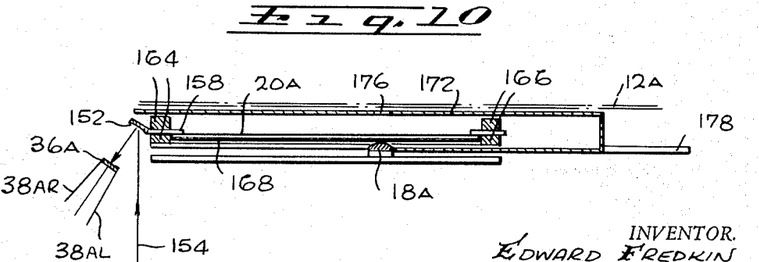
FIG. 10 is a sectional view taken on the line 10—10 of FIG. 9.

FIGS. 9 and 10 illustrate another embodiment of the invention wherein spherical concave mirror elements 150 and 152 are employed at the ends of cylindrical lenses 18A and 20A. Each mirror element is mounted near the ends of the lenses, on one of the lugs 156 and 158 which are used to guide the cylindrical lenses along guide rails 160, 162, and 164, 166. The mirror elements reflect the light from the luminous lines, instead of allowing it to pass through, to image the lines on line array plates. As shown in FIG. 10, the mirror 152 reflects light rays 154 from an area (not shown) with numerous luminous lines, onto a plate 36A. The plate 36A is similar to the plate 36 of FIGS. 6–8, having two narrow portions with transparent and opaque lines or strips, the lines on the two plate portions being offset from each other. Light passing through each portion of plate 36A is detected by one of the photodetectors 38AL and 38AR, which are similar to the photodetectors 38L and 38R described above. The mirror 152 is concave to focus the luminous line image in the plane of plate 36A, in the same manner as an ordinary convex lens or a cylindrical lens.

The use of the mirror element 152 allows the film record 12A to move along a straight path in back of the plate portion 36A, instead of being diverted at a sharp angle to prevent obscuring of light passing to the photodetectors 38AR and 38AL. The other mirror element 150 is used with line arrays and photodetectors similar to those used with element 152.

The apparatus of FIGS. 9 and 10 also employ a different light shield construction. Two rigid opaque light shields 168 and 170 are fixed to the cylindrical lens 20A. These shields lie behind the plane of the other lens 18A and the mirror 150 attached to the support lug 156 thereof, so they do not prevent light from being reflected by mirror 150 to its line array. A large light shield 172 which lies immediately in front of the plane of film 12A is attached to the cylindrical lens 18A. This eliminates the need for a foldable light shield. The shield 172 has a slot 176 in it which is aligned with the lens 18A, to allow light to pass through to the film. A bar structure 178 is connected to the lens 18A and shield 172 to move them together.

Various other light shielding arrangements can be used to shield the areas around the region where the cylindrical lenses cross, without blocking light to the line arrays of the position transducers. For example, color filter shields can be used together with scanning spots and luminous lines of different colors. In this case, the CRT, which provides a scanning spot, can have a phosphor at the center area of the tube face which produces a blue spot. Then, rigid blue filter shields can be attached to either side of the cylindrical lenses, that stop blue light but allow another color such as orange to pass. The luminous lines for imaging on the position transducer line array can be orange so that their orange rays pass through the blue filter shields to the striped array plates. Elongated opaque filters can be attached to the lenses at their ends which move over the line arrays, to allow only light passing through the lens end to fall on the arrays.

Figure 11:
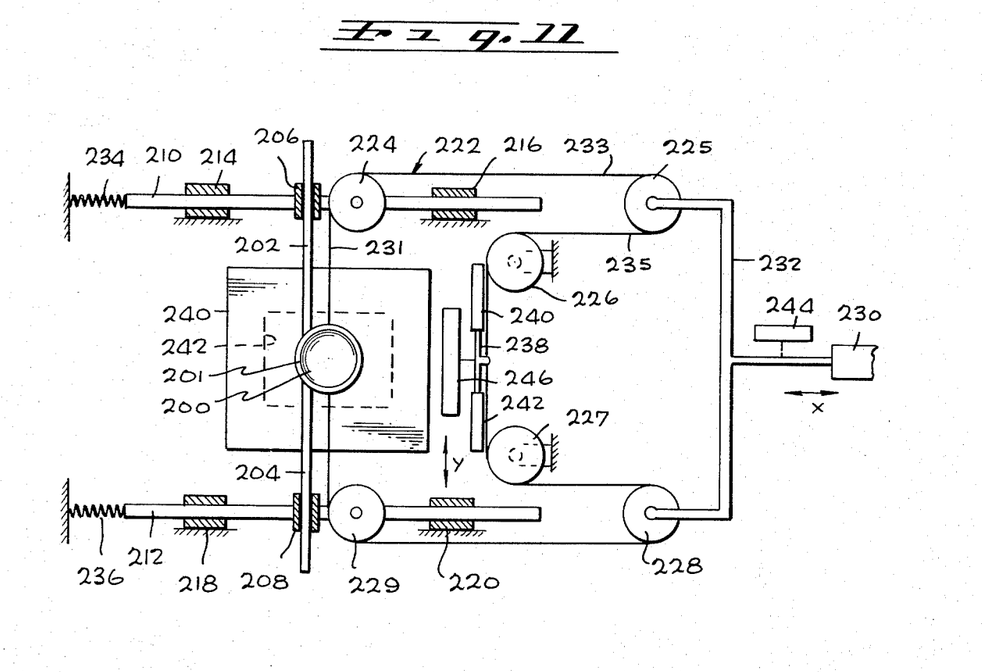
FIG. 11 is a partly diagrammatic, front elevation view of apparatus constructed in accordance with still another embodiment of the invention.

FIG. 11 illustrates still another embodiment of the invention wherein a small symmetrically convex lens 200 is utilized, which is driven laterally and vertically, or in the X and Y direction. The lens is mounted in a lens frame 201 that is supported by two rods 202 and 204 which slide in bearings 206 and 208. The bearings 206 and 208 are, inturn, mounted on rods 210 and 212 that are slidably mounted in fixed slider bearings 214, 216 and 218, 220.

The lens 200 is driven in the X and Y directions by a cable 222 that is fixed at its opposite ends to the lens frame. The cable extends around six pulleys 224 through 229. A first portion 231 of the cable extends in the Y direction, a second portion 233 extends 90° about pulley 224 and thence in a X direction, and a third portion 235 extends 180° about pulley 225 and thence in the X direction. The opposite end of the cable extends in a similar manner from the lens frame.

Pulleys 224 and 229 are fixed to the rods 210 and 212, respectively, while pulleys 226 and 227 are stationary, as by rotatably mounting them on the housing of the entire apparatus. The other two pulleys 225 and 228 are mounted on a drive link 232. A linear motor 230 drives the link 232 in the X direction. When the link 232 moves to the right, the pulleys 225 and 228 pull on the cable, causing the lens 200 to move to the right. Due to the lengthening of the cable portion between pulleys 225 and 226, and between pulleys 227 and 228, the lens is pulled to the right at twice the speed of link 232. When the motor moves the link 232 to the left, a pair of springs 234 and 236 pull the rods 210 and 212 to the left.

Vertical or Y direction motion, is achieved by motion of a link 238 that moves the cable portion to which it is attached up and down. The link is driven up and down by linear motors 240 and 242. Instead of using two linear motors for the Y drive, one motor and a return spring can be used. Conversely, another linear motor may be used in place of springs 234 and 236 on the X-axis drive. The X and Y positions of the lenses can be sensed by position sensors 244 and 246 that sense the position of the links 232 and 238. Pulleys 226 and 227 may be replaced by one large pulley to which the two joined cable ends are fixed, and the linear motors 240 and 242 can be replaced by a rotating reversible motor for driving the large pulley. A rotating angular position indicator, such as a shaft encoder, would then replace the linear position transducer 246.

A light shield 240 surrounds the lens 200 on all sides, to prevent light from falling on any region of the film frame area 242 outside the region covered by the lens. It may be noted that the area of the lens 200 can be made considerably larger than the raster area image, or area over which the scanning spot can move for a given lens position. Movement of the raster area image to cover a new region of the film may be made by a lens movement which is only about as large as the raster area image, but which is considerably smaller than the lens diameter.

Figure 12:
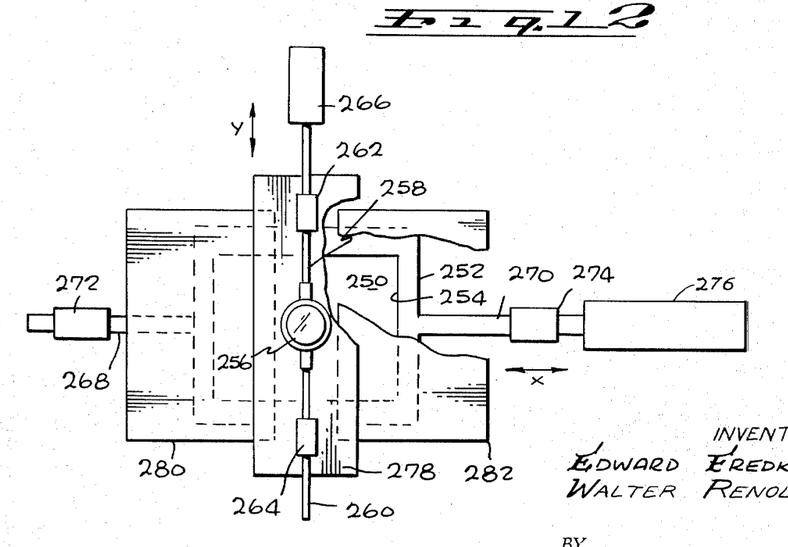
FIG. 12 is a front elevation view of apparatus constructed in accordance with yet another embodiment of the invention.

FIG. 12 illustrates an embodiment of the invention wherein the film is moved in a line path along the X axis while the lens is moved in a line along the Y axis. A frame 250 of film is held securely in a holder 252 which has an aperture 254 therein. A convex lens 256 is positioned over the film frame to image a scanning spot on it. The lens 256 is held by a pair of rods 258 and 260 that slide vertically in bearings 262 and 264, and a linear motor 266 moves the rods and lens up and down to desired positions. The frame holder 252 is supported on a pair of rods 268 and 270 that slide in bearings 272 and 274, and another linear motor 276 moves the rods and film holder in the X direction.

By moving the lens 256 in the Y direction and the film holder 252 in the X direction, a scanning spot can be imaged at any location on the film frame. A rigid shield 278 is fixed to the lens 256 to move up and down with it. A pair of stationary shields 280 and 282 on either side of the lens path further shield the film frame. The film frame 250 can be a small piece of film or a portion of a long film strip which is maintained in a loop to permit limited movement in the X direction by the linear motor 276.

The time required for the lens to be moved to cover a different region of the film can be minimized by using high torque-low inertia motors. Rotating armature motors, or linear motors such as those used in high compliance loudspeakers can be employed. Even with such motors, an appreciable time is required to accelerate the lens, as compared to the movement of the CRT scanning spot. In some modes of operations, both the lens and the spot may be continually moving. If a spot moves so fast that it reaches the edge of the raster area, the CRT can be blanked while the lens "catches up." During this time the computer program is stopped, the program being resumed when the spot has been unblanked.

While the foregoing embodiments of the invention have been described in connection with a high speed reader, they also can be used in high speed recording apparatus. In this case, an unexposed record medium such as unexposed film, is placed behind the lens so that the scanning spot image thereon exposes the film. Of course, a variety of record mediums can be used, on which pictorial information is recorded or on which it can be recorded.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus for moving a spot image over a frame area of a record medium comprising:
   light means for establishing a light spot, including means for rapidly moving said light spot along first and second perpendicular axes within a predetermined raster area;
   means for supporting said record medium;

means for imaging said raster area to a predetermined fractional magnification on a region of said said record medium, said fractional magnification being at a value to limit the area of the raster area image to a fraction of said frame area; and means for moving said means for imaging, to move said raster area image to different regions of said frame area.

2. The apparatus described in claim 1 wherein:

said means for imaging comprises a pair of cross elongated cylindrical lenses; and said means for moving comprises means for moving said cylindrical lenses substantially perpendicular to their length.

3. The apparatus described in claim 1 wherein:

said means for imaging comprises an imaging lens; and said means for moving comprises an elongated member fixed to said lens and extending in a first direction, first bearing means for guiding said elongated member in motion along its length to guide said lens in said first direction, second bearing means for guiding said first bearing means in motion along a second direction perpendicular to the length of said elongated member to guide said lens in said second direction, and means for moving said elongated member and first bearing means in said first and second directions, respectively.

4. The apparatus described in claim 1 wherein:

said means for moving comprises means for translating said means for imaging back and forth along a predetermined substantially line path; and including means for moving said record medium in a direction substantially perpendicular to said predetermined line path.

5. The apparatus described in claim 1 including:

means for establishing a plurality of stationary parallel luminous lines;

line array means mounted stationary with respect to said means for establishing luminous lines, said array means comprising a multiplicity of alternate light stopping and light passing strips;

means for substantially imaging said luminous lines on said array means with a fractional magnification that establishes the separation of the luminous lines of said image substantially equal to the separation of an integral number of said strips, said means for imaging said luminous lines mounted for movement with said means for imaging said raster area; and means for detecting light falling on said light passing strips.

6. The apparatus described in claim 1 including:

means for establishing a plurality of substantially stationary parallel luminous lines;

line array means including first and second elongated portions, each having a multiplicity of alternate light stopping and light passing strips spaced along its length, the strips of said first and second portions offset from one another;

means for holding said line array means substantially stationary;

means for substantially imaging said luminous lines on said first and second array means with a magnification that establishes the separation of the luminous lines of the image substantially equal to the separation of an integral number of said strips;

means for coupling said means for imaging said luminous lines to said means for imaging said raster area to move therewith;

first and second means for detecting light incident on said light passing strips of said first and second array means portions, respectively; and means responsive to said first and second means for detecting light, for detecting the position of said means for imaging said raster area in a direction parallel to the length of said array means portions.

7. Apparatus for moving a light spot over a record medium comprising:

cathode ray tube means for establishing a scanning spot on its face;

tube driving means for moving said spot in first and second orthognal directions within a predetermined raster area on the face of said tube;

means for supporting said record medium;

lens means for imaging said scanning spot on said record medium to a magnification scale which images said raster area to cover only a fraction of the area of said record medium; and means for moving said lens means, to move the image of said raster area to different portions of said record medium.

8. The apparatus described in claim 7 wherein:

said lens means comprises a pair of elongated substantially cylindrical lens means, and lens supporting means for supporting said cylindrical lens means perpendicular to each other; and said means for moving comprises motor means for driving said lens supporting means to translate said cylindrical lens means in directions perpendicular to their length; and including first and second shield means, each extending on either side of one of said elongated cylindrical lens means and mounted for movement therewith, to allow light to pass to said record medium only through the position where said pair of cylindrical lens means cross.

9. The apparatus described in claim 8 including:

a position transducer light source;

means at an end portion of a first of said cylindrical lens means, for passing at least some of the light from said light source; and light detector means for detecting light behind said means for passing light from said light source; and wherein the light shield means mounted for movement with a second of said cylindrical lens means includes a foldable portion nearest said means for passing light, and means for folding and unfolding said foldable portion as said second cylindrical lens means moves toward and away from said means for passing light.

10. The apparatus described in claim 7 including:

light shield means for movement with said lens means;

a transducer light source;

mirror means for reflecting light from said transducer light source, said mirror means mounted for movement with said lens means; and means positioned to receive light from said mirror means for generating position-indicating signals, whereby to prevent interruption of light transmitted to said means for generating position-indicating signals.

11. The apparatus described in claim 7 wherein:
said means for moving said lens means comprises
means for rapidly translating said lens means along substantially a line path; and including
means for rapidly moving said record medium in a path substantially perpendicular to said line path.

12. The apparatus described in claim 7 wherein:
said lens means comprises a focusing lens; and
said means for moving said lens means comprises
first guiding means for guiding said lens in a first direction of motion,
second guiding means for guiding said first guiding means in a second direction of motion perpendicular to said first direction,
first pulley means mounted on said second guiding means to move with it,
a cable having a first end coupled to said first guiding means, including a first cable portion extending from said first end in a direction substantially parallel to said first direction of motion to said pulley means, and a second cable portion extending approximately 90° about said pulley means and thence in a direction substantially parallel to said second direction of motion, and
means for pulling said cable relative to motion of said second guiding means to move said lens in said first direction.

13. The apparatus described in claim 7 wherein:
said lens means comprises a focusing lens; and
said means for moving said lens means comprises
first guiding means for guiding said lens in a first direction of motion,
second guiding means for guiding said first guiding means in a second direction of motion perpendicular to said first direction,
first and second pulley means mounted on said second guiding means on opposite sides of said lens,
a link;
third and fourth pulley means mounted on said link;
means for moving said link in said second direction of motion;
cable means having opposite ends coupled to said first guiding means, and including portions extending from said ends in opposite directions parallel to said first direction of motion, then 90° about said first and second pulley means, then to said third and fourth pulley means, then 180° about said third and fourth pulley means, and then along a position where they are joined to each other; and
means for moving said cable means at said position where said portions thereof are joined to each other, whereby to move said lens means in said first direction by motion of said means for moving said cable means, and in said second direction by one-half the motion of said link.

14. In high speed reader/recorder apparatus wherein lens means is moved over a record medium area to image a light spot on different regions of said area, the improvement comprising:
means defining a multiplicity of luminous lines;
means mounted for movement with at least a portion of said lens means, for substantially forming an image of said luminous lines;
an array of light passing and light stopping strips mounted in the plane of said image of luminous lines, including strips spaced apart by the spacing of said luminous lines in said image thereof; and
means for detecting light incident on said light passing strips.

15. The improvement described in claim 14 wherein:
said array includes first and second elongated array sections, each having light passing and light stopping strips, the strips in said first and second array sections being offset from each other; and
said means for detecting light includes first and second detectors for detecting the light incident on said light passing strips of said first and second array portions, and means responsive to said detectors for sensing the position of said means for forming an image.

16. The improvement described in claim 14 wherein:
said light passing and light stopping strips comprise transparent and opaque lines, respectively.

17. The improvement described in claim 14 wherein:
said means for forming an image comprises a concave mirror.

18. In high speed reader/recording apparatus wherein a light spot is made to move over a record medium, the improvement comprising:
first and second elongated substantially cylindrical lenses;
means for holding said lenses so they cross each other to form a spot image of a light spot on said record medium; and
means for moving said lenses substantially perpendicular to their length.

19. The improvement described in claim 18 including:
light shield means mounted on each of said lenses, said shield means extending on each side of each of said lenses.

* * * * *